United States Patent [19]
Rossi et al.

[11] Patent Number: 4,718,552
[45] Date of Patent: Jan. 12, 1988

[54] DISK SHIPPER AND TRANSFER TRAY

[75] Inventors: Alexander N. Rossi, Pleasanton, Calif.; Lynn Milbrett, Young America, Minn.

[73] Assignee: Fluoroware, Inc., Chaska, Minn.

[21] Appl. No.: 937,680

[22] Filed: Dec. 1, 1986

[51] Int. Cl.⁴ ............................................. B65D 85/57
[52] U.S. Cl. ................................... 206/444; 206/334; 206/454; 206/508; 206/511; 206/515
[58] Field of Search ............... 206/508, 511, 515, 444, 206/334, 454

[56] References Cited

U.S. PATENT DOCUMENTS 3,850,296 11/1974 Hirata et al.
4,043,451 8/1977 Johnson.
4,061,228 12/1977 Johnson.
4,450,960 5/1984 Johnson.
4,557,382 12/1985 Johnson.
4,588,086 5/1986 Coe ..................................... 206/444

Primary Examiner—William Price
Attorney, Agent, or Firm—Faegre & Benson

[57] ABSTRACT

A disk shipper and transfer tray are configured so as to allow the disk contents to be handled either by their internal diameter or by their external diameter. The transfer tray and the bottom of the disk shipper are further configured so as to be compatible with certain existing disk carriers in transferring the disk contents of the transfer tray or the bottom of the disk shipper to the particular disk carrier and vice versa. Since the particular disk carrier with which the transfer tray and the bottom of the disk shipper are compatible prohibits external diameter handling, the novel disk shipper bottom and transfer tray facilitate transposing the disks into a configuration that permits both external and internal diameter handling.

18 Claims, 20 Drawing Figures

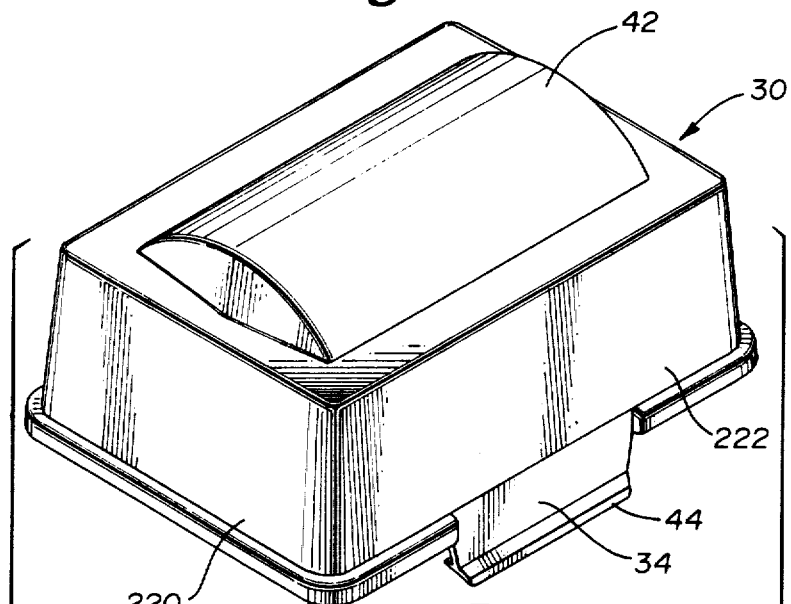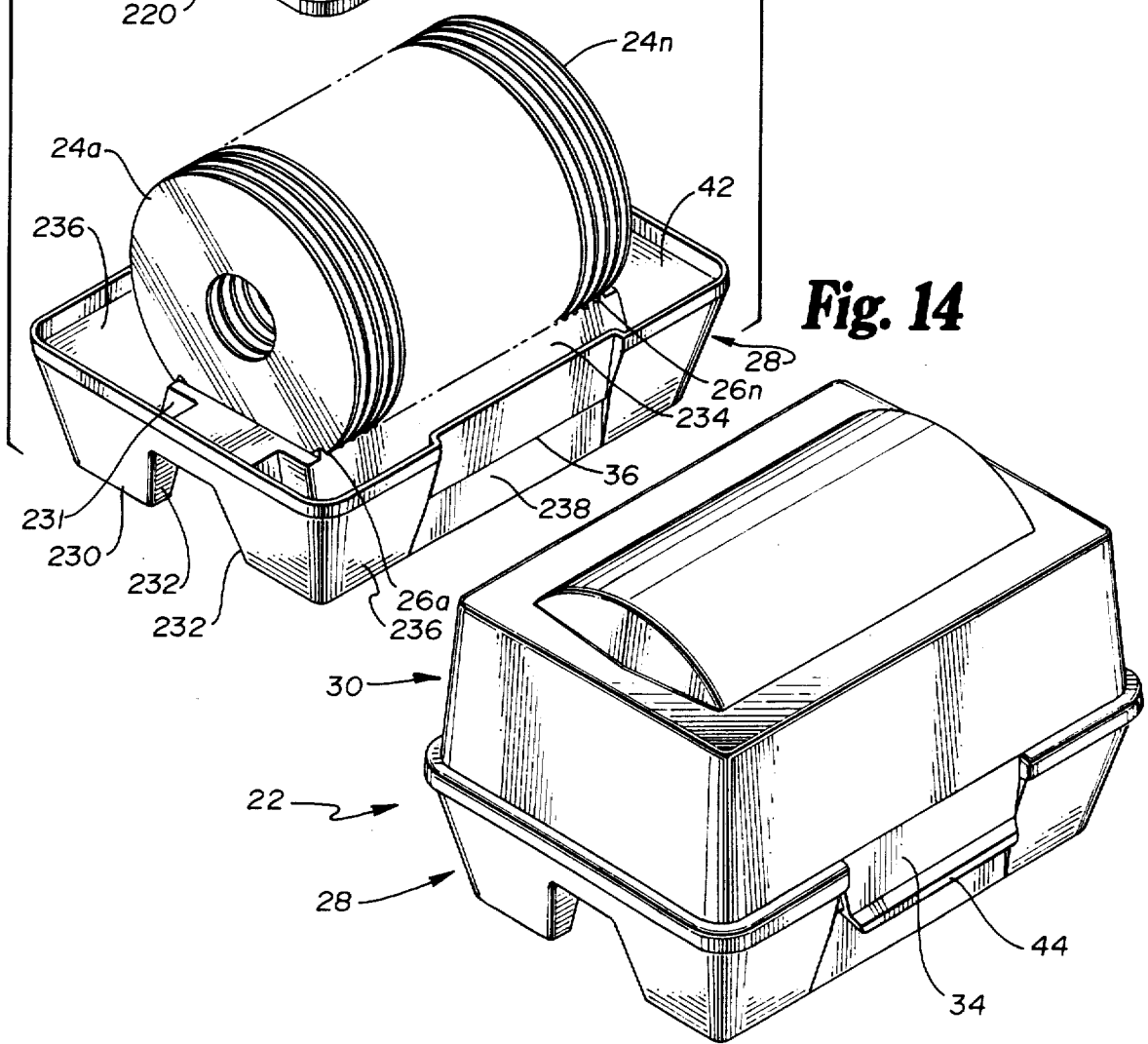

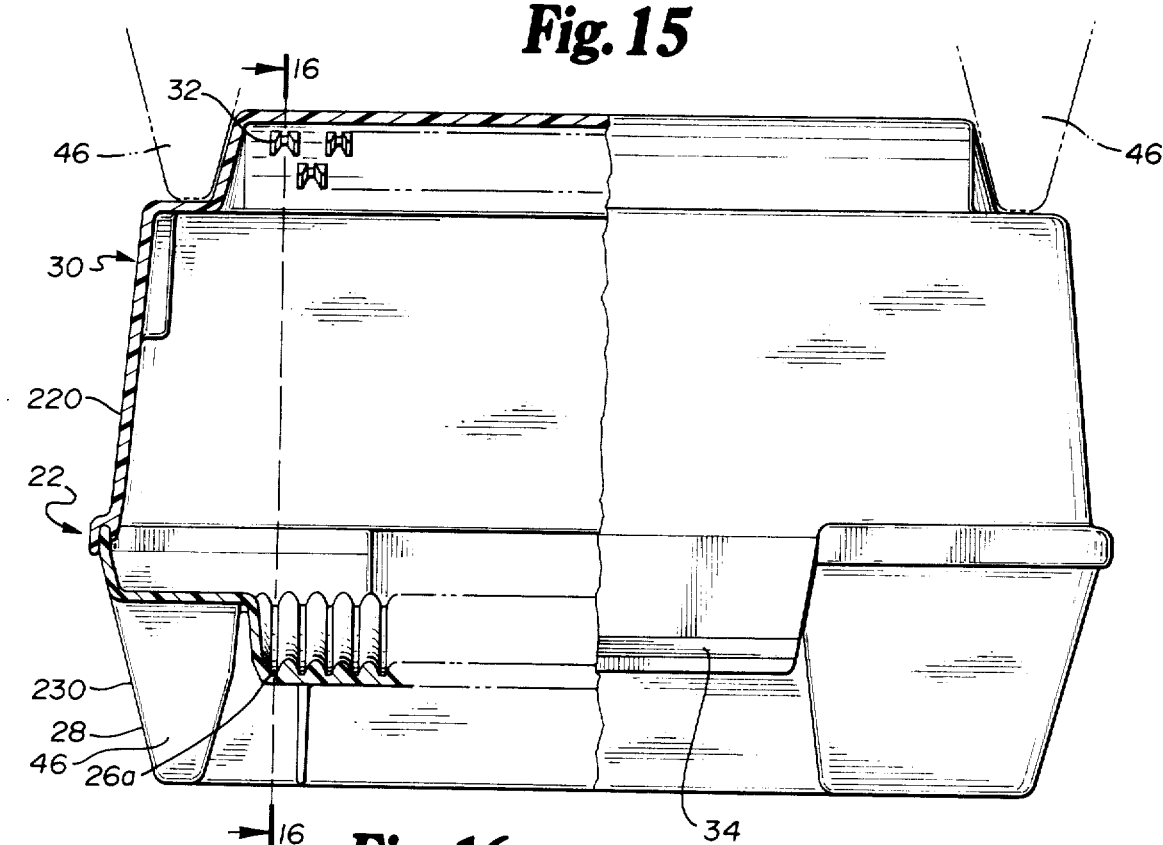
Fig. 15
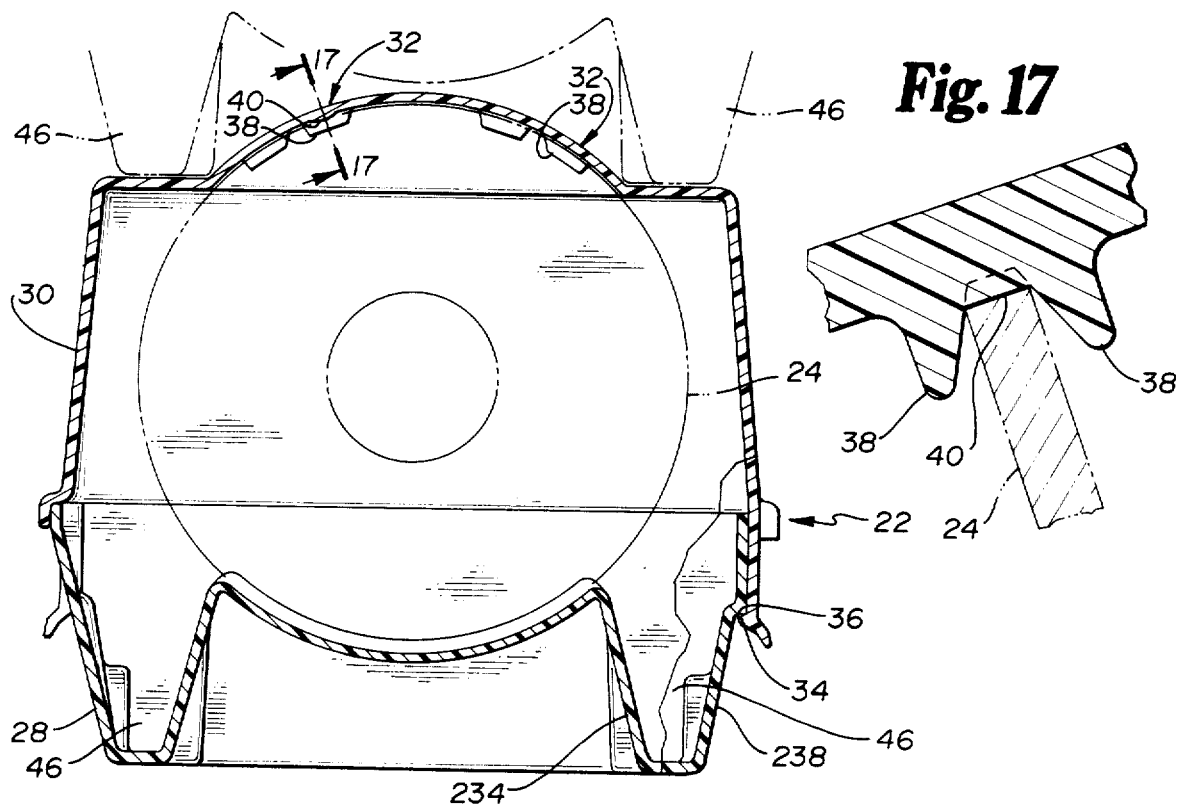
Fig. 16
Fig. 17

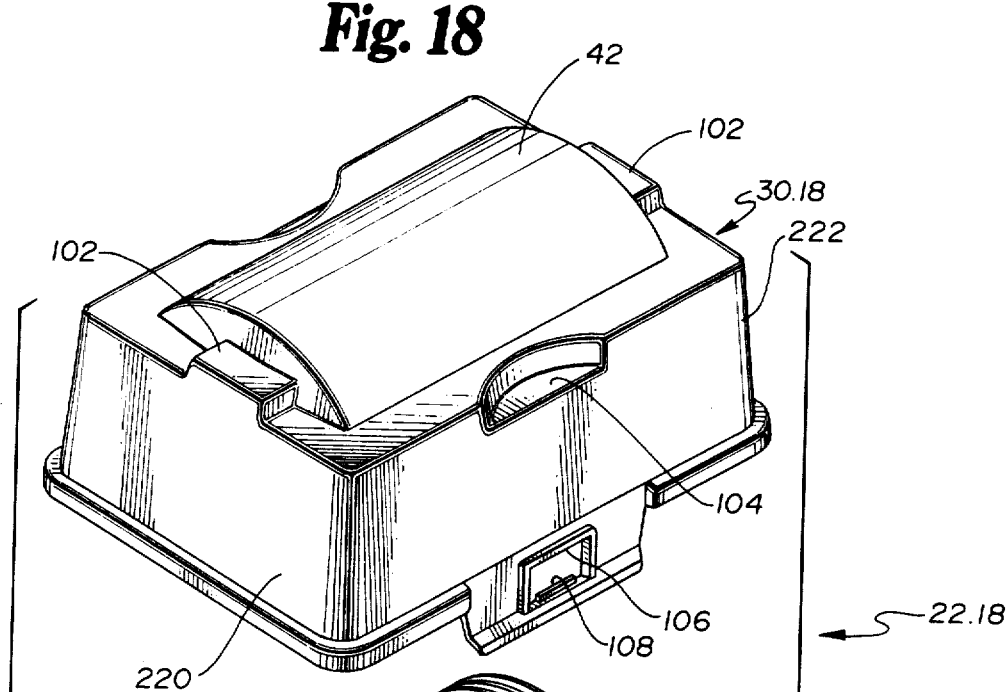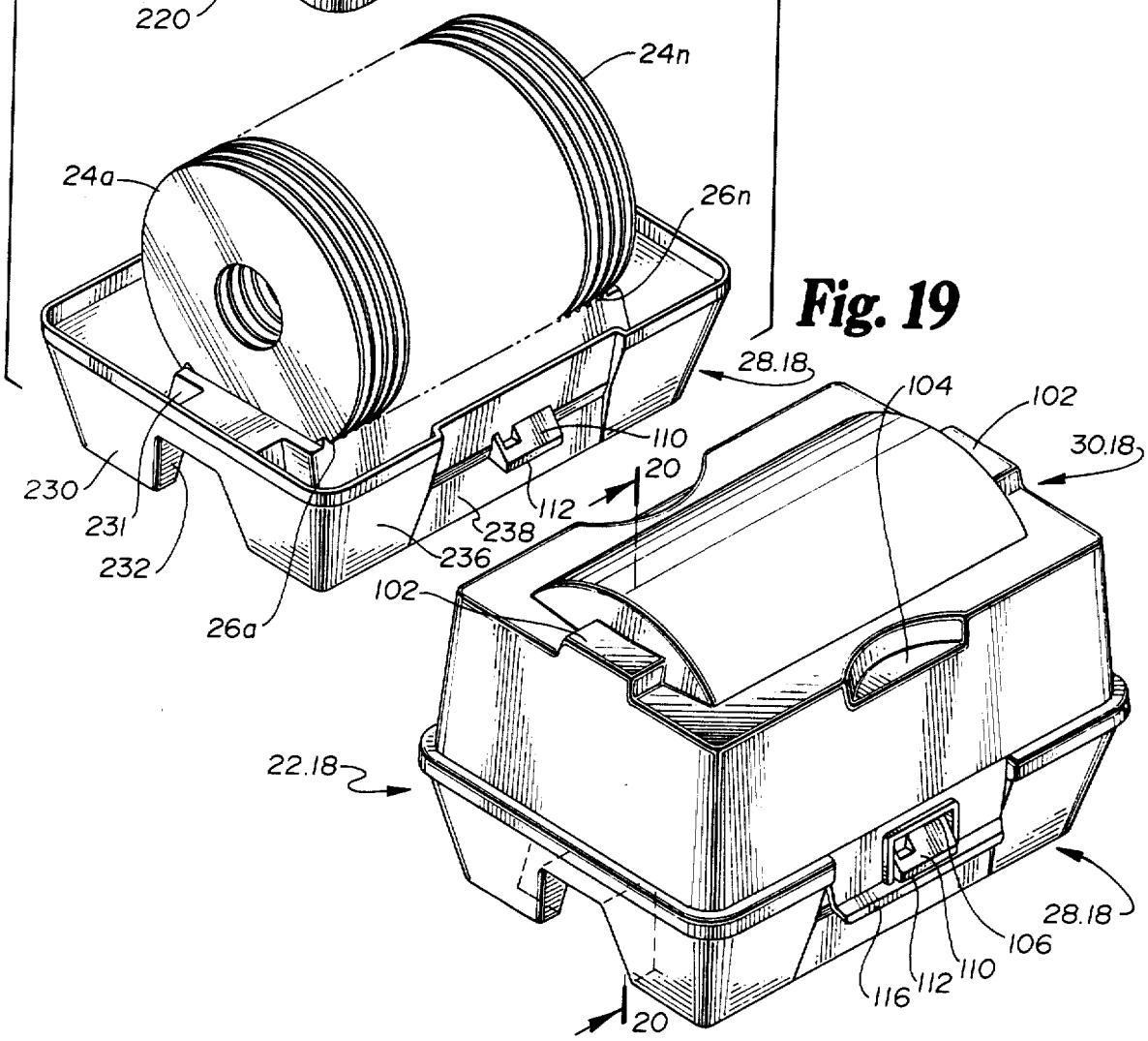

4,718,552

DISK SHIPPER AND TRANSFER TRAY

BACKGROUND OF THE INVENTION

1. Field of the Invention

The present invention provides products of novel design to facilitate the handling and shipping of disks and disk like materials. More specifically, the present invention provides a disk shipper for the secure transportation and storage of relatively rigid information storage disks, with the disks held in the shipper bottom in an axial alignment accessible to either internal or external diameter handling. The bottom of the disk shipper of this invention is designed to allow the disks to be loaded into the shipper bottom from a compatibly designed existing disk carrier in a simple non-rolling transfer operation. This invention also provides a transfer tray which is designed to allow relatively rigid information storage disks to be transferred therein from a compatibly designed existing disk carrier in a simple non-rolling transfer operation and support the disks in the tray in an axial alignment accessible to either internal or external diameter handling. The compatible designed existing disk carrier, with which the disk shipper and the transfer tray of this invention are designed to be transfer compatible, by contrast only allows the disks to be handled by their internal diameter.

Most traditional information storage disk handling devices have generally been adapted to only internal diameter handling of the disks. Thus, the present novel designs are particularly useful with newly developed techniques for manual and automated disk placement and processing which utilize external diameter disk handling techniques.

Another unique feature of the present novel products is the ability to transfer disks from either the disk shipper or the transfer tray of this invention to a compatibly designed disk carrier or vice versa while maintaining the disks securely held throughout the transfer procedure so that undesirable rolling of the disks is avoided while the transfer procedure is smoothly and efficiently carried out. It has been noted that rolling of the disks in transfer operations, traditionally referred to as "dumping", is a source of damage to the disks by the generation of deleterious particulate. Since the disk carriers with which the present disk shipper and transfer tray are transfer compatible, do not allow for external diameter handling of the disks, this transfer procedure allows the disks to be transposed into an axial alignment permitting either internal diameter or external diameter handling.

The type of disks intended to be used with the disk shipper and transfer tray of this invention are relatively rigid information storage disks, such as optical disks, aluminum computer disks, compact disks and computer memory storage disks. Although, the design of the disk shipper and transfer tray of this invention may be able to be modified to be suitable for use with more fragile wafers, such as silicon wafers, they are primarily designed for use with more relatively rigid information storage disks.

2. Description of Related Art

Throughout the development of the information storage disk processing industry, handling and shipping product designs have had to keep pace with changes in the state-of-the-art of both manual and automated techniques. Current information storage disk processing procedures utilize handling of the disks by both internal and external diameter. Therefore, there is a great demand for disk handling and shipping products which will allow the disks to be easily handled by either their internal or external diameter and at the same time be compatible with previously available internal diameter access disk carriers to facilitate transfer thereto and vice versa.

The present invention fills a great unmet need in this art area by providing a disk shipper which not only provides a study and convenient package for handling and transportation in a safe and secure manner, but also by providing a disk shipper which is designed to be compatible with existing internal diameter access disk carriers, so that the disks can be easily and safely transferred from the disk carrier to the shipper bottom or vice versa in a simple operation.

Additionally, the transfer tray of this invention provides a handling device to facilitate the non-rolling transfer of disks to and from a compatibly designed internal diameter access disk carrier, and maintains the disks in an upright parallel spaced-apart axial alignment accessible to either internal or external diameter manual or automated handling.

Currently available disk shipper designs which allow both internal and external disk handling are not transfer compatible with existing internal diameter access disk carriers. Empak, Inc. of Minnesota and Encore International of California both currently offer disk shippers which allow the disks to be accessed by either the internal or the external diameter, but which are not transfer compatible with existing disk carriers. Accordingly, the disks must be loaded by tedious and time consuming methods, which present the attendant problems of damage to the disks by particle generation, scratching or dropping.

In addition, many other deficiencies have been noted with previous disk shippers. Certain information storage disk shipping packages now available require three components to provide a secure package: a top, a bottom and a cassette insert. Thus, U.S. Pat. Nos. 4,557,382 and 4,450,960 require this type of arrangement, adding to the cost of materials involved, the storage space for the component parts and the time involved in assembling and disassembling the package.

Other disk shippers require separate cushioning inserts inside the top and bottom members to ensure alignment and positioning of the disks. U.S. Pat. Nos. 3,850,296; 4,043,451 and 4,061,228 all require some type of additional cushioning arrangement.

Further, there is currently not available a device for transferring relatively rigid information storage disks from internal diameter access disk carriers to a tray which maintains the disks in a secure upright parallel spaced-apart axial alignment allowing either external or internal diameter handling.

The present invention overcomes these and many other deficiencies noted in disk shipping and handling devices as will become apparent from the further consideration of the present disclosure.

SUMMARY OF THE INVENTION

The present invention is designed to provide a disk shipper and a disk transfer tray which keep pace with recent developments in manual and automated procedures requiring the disks to be accessible for either internal or external handling and, at the same time, provides a disk shipper and a disk transfer tray which are transfer compatible with existing disk carriers.

The disk shipper according to this invention consists of a shipper bottom and a shipper cover which mates with the bottom in latching attachment. The shipper bottom includes a generally rectangular floor member having a disk nest elevated above the floor member. The disk nest comprises a plurality of arcuate disk engaging and supporting grooves curved to the peripheral contour of the disks to engage and support the disks in upright parallel spaced-apart axial alignment. The four sides of the shipper bottom are angled upwardly and slightly outwardly from the floor member. A female trough inside the four sides substantially surrounds the disk nest. There are latching ledges on opposite sides of the shipper bottom for latching engagement with latch hooks on the shipper cover. Cover positioning members extend vertically upwards from the sides of the shipper bottom. The disk nest and the sides of the shipper bottom are configured so that the disks are accessible to internal diameter handling and to external diameter handling substantially below the horizontal centerline of the disk.

The shipper cover includes a generally rectangular top member having a plurality of arcuate disk locating elements in cooperating alignment with the arcuate disk supporting grooves in the shipper bottom to maintain the disks in upright parallel spaced-apart axial alignment, four sides angled downwardly and slightly outwardly from the top member, latching hooks on opposite sides in cooperating alignment with the latching ledges on the shipper bottom, and bottom positioning members extending vertically downwards from the sides in cooperating alignment with the cover positioning members on the shipper bottom.

The disk shipper of this invention allows the disks to be handled manually or through automation by either the internal diameter or the external diameter in removing them from or inserting them into the shipper bottom.

Another unique feature of the disk shipper of this invention is the ability to transfer the disks from the shipper bottom to an existing compatibly designed internal diameter access disk carrier and vice versa in a manual operation without rolling of the disks.

The existing internal diameter access disk carriers with which the shipper bottom of the present disk shipper is designed to be transfer compatible are described as follows. The disk carrier has opposed side walls for carrying a plurality of axially aligned disks therebetween, an open top through which disks may be inserted and ejected, end walls joining the side walls, and a bottom engaging and supporting the disks in upright parallel spaced-apart axial alignment. The disk support surfaces of the disk carrier and the disk supporting grooves of the shipper bottom have the same radius of curvature, maintain the same axial disk spacing between the plurality of disks and have the same total disk capacity. The side walls of the disk carrier fit into the trough of the shipper bottom, allowing the plurality of disks to be engaged and supported by both the disk support surfaces of the disk carrier and by the disk supporting grooves of the shipper bottom simultaneously. According to this invention, the term "disk carrier" is intended to refer to any type of disk carrying receptacle which is transfer compatible with the shipper bottom of this invention as just described, including such disk carrying receptacles as process carriers, disk baskets and existing shipper bottoms which do not permit external diameter handling of the disks.

With the disk carrier and the disk shipper bottom both engaging and supporting the plurality of disks simultaneously, the disk carrier-disk shipper assembly can be manually inverted, thus transferring the disks from the carrier to the shipper bottom or vice versa without rolling or dropping of the disks.

Internal diameter access disk carriers designed to be transfer compatible with the shipper bottom of the present disk shipper are available from Fluoroware, Inc., Minnesota, designated as Fluoroware PA183, PA185, PA806-130, PA803-130, PA804-130, PA800-095, PA803-095 style process carriers and S800-130 and S800-095 shippers and from Empak, Inc., Minnesota, designated as F20-130-01 style process carrier and F10-130 and F10-095 shippers.

The present disk shipper also offers a unique shock absorbing cushioning effect provided by the shape of the area where the disks are supported in the shipper bottom and the shipper cover to prohibit transverse and lateral movement of the disks and to prevent scratching or damaging of the disks during handling. The disk shipper has a smooth exterior that permits a heat shrinkable plastic package to be formed around the shipping container if desired and purged with an inert gas to provide additional structural integrity to the shipper and to provide additional protection against environmental contamination.

The assembled shipper packages are designed to be securely stackable with each other, the shipper bottoms and covers are individually nestable for economy of space. Because the disk shipper is intended as a reusable container, the cover and bottom components are designed to allow for complete drainage of liquids when cleaned in standard equipment.

Since the disk shipper is intended to provide safe and secure packaging for transportation by common carrier, a package loaded with relatively rigid information storage disks is designed to withstand normal handling without causing the disks to be damaged and rendered unusable.

The transfer tray of this invention is designed to transfer the disks from a compatibly designed internal diameter access disk carrier in a simple manual operation without rolling of the disks and to securely maintain the disks in the transfer tray in upright parallel spaced-apart axial alignment accessible to internal diameter handling or external diameter handling substantially below the horizontal centerline of the disks. The disk carrier which is designed to be transfer compatible with the transfer tray of this invention is the same as described above in reference to the shipper bottom.

The transfer tray comprises a generally rectangular receptacle having a floor member with a disk nest elevated above the floor member, the disk nest comprising a plurality or arcuate disk supporting grooves curved to the peripheral contour of the disks to support the disks in upright parallel spaced-apart axial alignment, handle holds on opposite sides of the transfer tray and downwardly angled feet to support the transfer tray in a self standing position and the transfer tray configured to allow internal diameter handling or external diameter handling of the disks substantially below the horizontal centerline of the disk.

The side walls of the disk carrier and the disk nest of the transfer tray are configured so that a plurality of disks can be engaged and supported by both the disk support surfaces of the disk carrier and by the disk engaging and supporting grooves of the transfer tray simultaneously. With the disk carrier and the transfer tray both engaging and supporting the plurality of disks simultaneously, the disk carrier-transfer tray assembly can be manually inverted, thus transferring the disks from the disk carrier to the transfer tray or vice versa without rolling or dropping of the disks. For economy of space, the transfer trays are nestable when empty. Since the transfer tray is intended as reusable, its design allows for complete drainage of liquids when cleaned in standard equipment.

BRIEF DESCRIPTION OF THE DRAWINGS

The many advantages of the devices of this invention will be readily appreciated by those of skill in this art by reference to the following detailed description when considered in connection with the accompanying drawings, in which like reference numbers refer to like parts throughout.

FIG. 13 is an exploded pictorial view of a disk shipper showing the shipper bottom with the shipper cover suspended thereover preparatory to being lowered into a latching position.

FIG. 14 is a pictorial view of the assembly of the shipper bottom and shipper cover into a disk shipper pack.

FIG. 15 is a side elevational view of a disk shipper pack with parts cutaway showing the grooves in the shipper bottom below and the cooperatively aligned locating elements in the shipper cover above.

FIG. 16 is a sectional view taken along line 16—16 of FIG. 15.

FIG. 17 is a greatly enlarged auxiliary cross sectional view taken along line 17—17 of FIG. 16, with a portion of a disk shown in phantom line.

FIG. 18 is an exploded pictorial view of an alternate form of shipper bottom and alternate form of shipper cover, with the shipper cover suspended over the shipper bottom preparatory to being lowered into a latching position.

FIG. 19 is a pictorial view of the closed and latched alternate form of shipper pack of the form shown in FIG. 18.

DETAILED DESCRIPTION OF THE INVENTION

Figure 1:
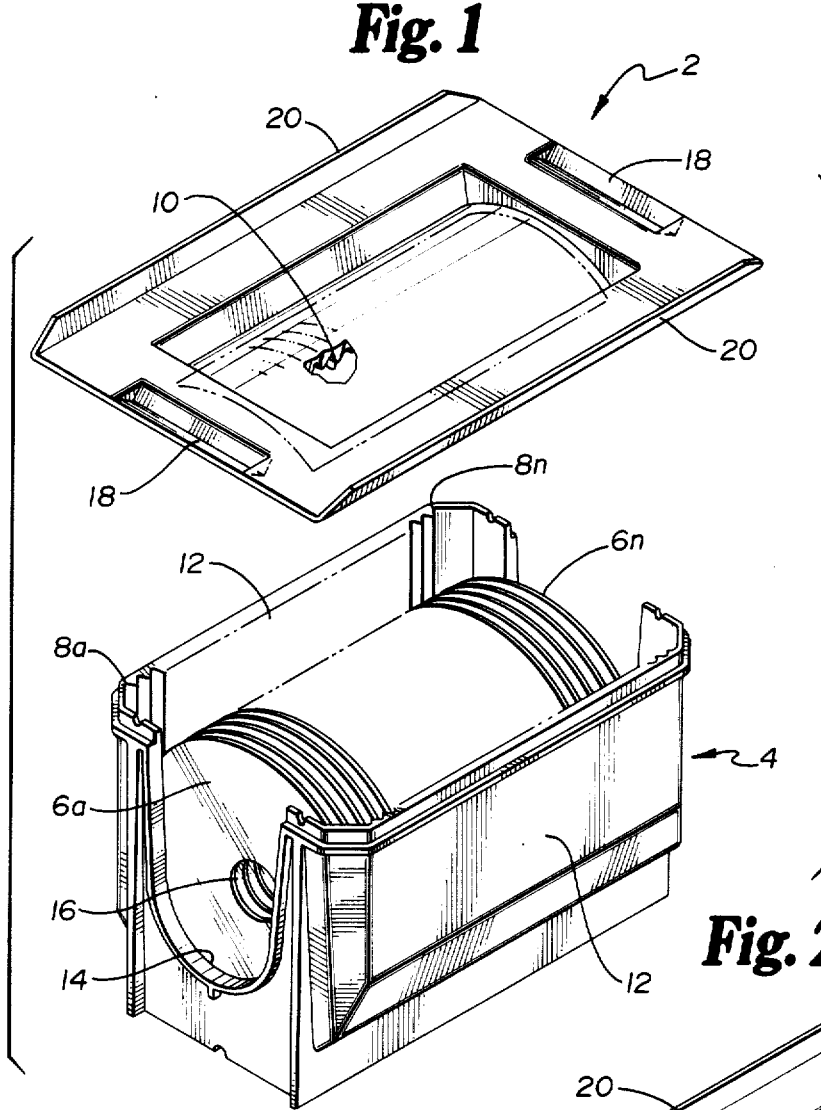
FIG. 1 is an exploded pictorial view of a transfer tray suspended over a carrier in nesting alignment therewith.
Figure 2:
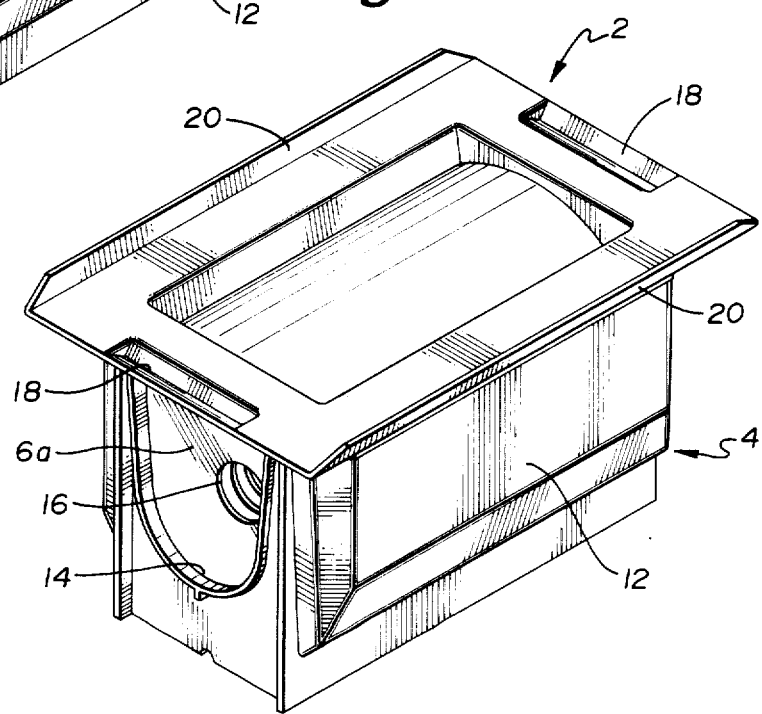
FIG. 2 is a pictorial view of the transfer tray and carrier in cooperative assembly.
Figure 3:
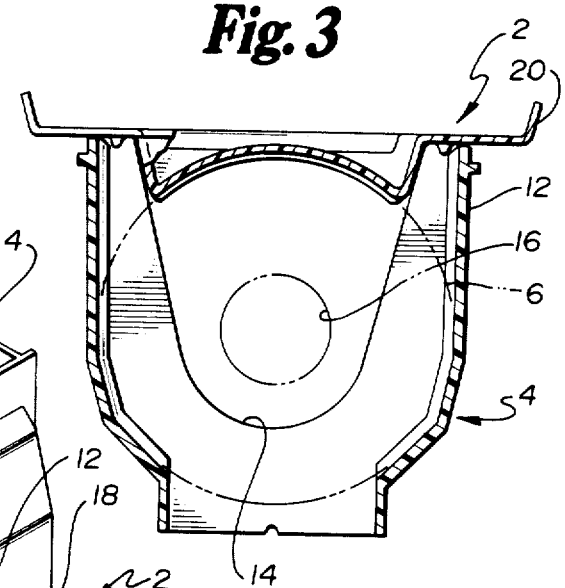
FIG. 3 is an end elevational profile view of the disk carrier-transfer tray assembly.
Figure 4:
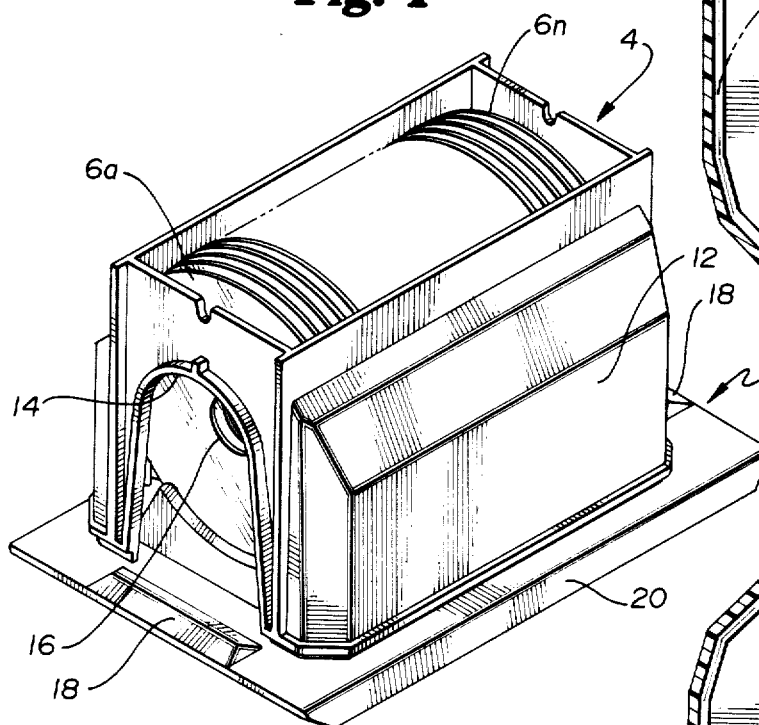
FIG. 4 is a pictorial view of the transfer tray-disk carrier assembly of FIG. 3 showing the assembly inverted therefrom.
Figure 5:
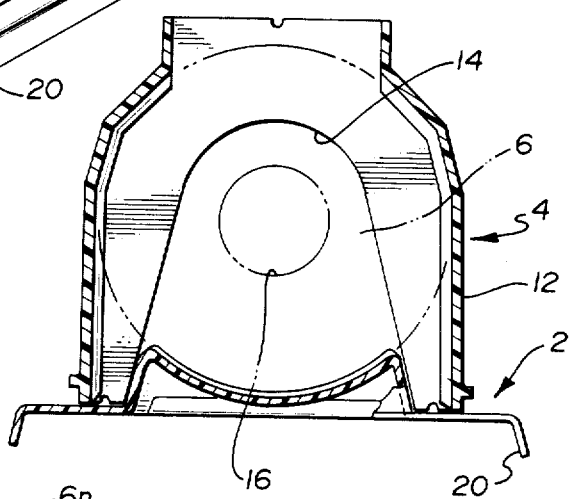
FIG. 5 is a view similar to that of FIG. 3 showing the assembly inverted as in FIG. 4.
Figure 6:
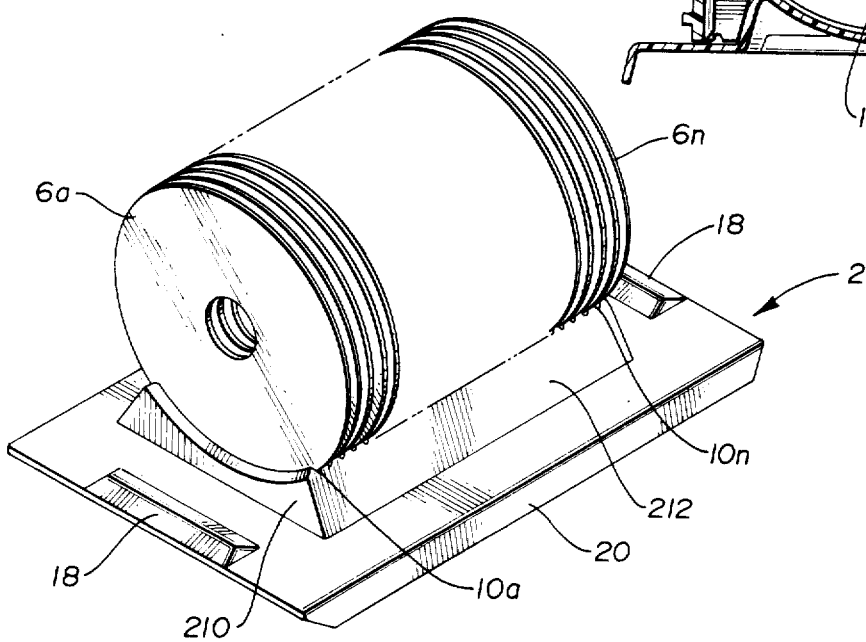
FIG. 6 is a pictorial view of the transfer tray showing disks resting in their respective grooves after removal of the carrier.

The transfer tray 2 of the present invention pointing downward is suspended directly over a disk carrier 4 in preparation to being nested thereon, as illustrated in FIG. 1. FIG. 1 also shows a plurality of wafers 6a–6n placed in respective wafer separating grooves 8a–8n within the disk carrier 4. A similar set of grooves 10a–10n in the transfer tray 2 is shown in partial cutaway extending within the phantom line field in the transfer tray 2. Notice that the arrangement of the side walls 12 and the open end 14 of the disk carrier 4 allow handling of the disks 6a–6n only by means of their internal diameter through the center hole 16. FIGS. 2 and 3 illustrate the transfer tray 2 and the disk carrier 4 assembled in nested alignment. In FIGS. 4 and 5 is shown the transfer tray 2 and the disk carrier 4 assembled in nested alignment, but with the assembly now inverted from the position shown in FIGS. 2 and 3, so that the disks 6a–6n are now resting primarily upon the grooves 10a–10n of the transfer tray 2. The transfer tray 2 with the disks 6a–6n securely supported in upright spaced-apart parallel alignment resting in their respective grooves 10a–10n after removal of the disk carrier 12 is illustrated in FIG. 6. Notice that the low profile design of the transfer tray 2 allows free access to the external diameter of the disks 6a–6n substantially below their horizontal centerline. No more than 30% of the area of the disk is obscured by the grooves of the tray. The arrangement of the computer disks 6a–6n when supported solely by the transfer tray 2 as illustrated in FIG. 6 makes the disks easily accessible to manual or automated handling by either their internal or external diameter.

In operation, the transfer tray 2 is lowered into position over a disk carrier 4 so that the grooves 10a–10n of the transfer tray 2 engage the disks 6a–6n held by the disk carrier 4. By using the handles 18 at either end of the transfer tray 2 and firmly holding the transfer tray 2 and disk carrier 4 assembly in cooperating alignment, the transfer tray 2 and disk carrier 4 assembly in cooperating alignment, the transfer tray 2 and disk carrier 4 assembly is carefully inverted and set down on the supporting transfer tray feet 20. The cooperating alignment of the grooves 10a–10n of the transfer tray 2 with the disks 6a–6n held by the disk carrier 4 is such that the inversion is accomplished without rolling or dropping of the disks 6a–6n. The disk carrier 4 is then carefully lifted up and away from the disks, leaving the disks firmly supported by the grooves 10a–10n of the transfer tray 2 in upright parallel spaced-apart axial alignment. Since the low profile of the transfer tray 2 permits free access to the disks 6a–6n substantially below their horizontal centerline, the disks are now easily accessible from the transfer tray 2 by either internal or external diameter handling techniques.

The transfer tray 2 may be formed of a rigid material capable of securely holding and accurately locating the disks. A suitable material has been found to be ABS synthetic resin optionally containing an anti-static protective additive. The transfer tray 2 can be formed to accommodate any size diameter and thickness of disk, bearing in mind that the grooves 10a–10n must always be configured to cooperatively align with the disks held by the disk carrier 4 from which the disks are to be transferred. Similarly, the transfer tray 2 can be formed to accommodate any number of disks, again bearing in mind that the transfer tray 2 must always be sized to accommodate the capacity of the disk carrier from which the disks are to be transferred. Typical sizes of transfer trays are designed to accommodate up to 25, up to 30 or up to 50 disks. The transfer trays are designed to be nestable when empty. Referring to FIG. 6, generally upstanding walls 210 and 212 respectively are sufficiently sloped at normal draft angle or greater to permit an unused plurality of carriers to be stacked in a space saving manner.

FIG. 13 illustrates the disk shipper 22 of the present invention containing a plurality of disks 24a–24n resting in upright parallel spaced-apart axial alignment within respective grooves 26a–26n in the shipper bottom 28, configured identically to the grooves 10a–10n of the transfer tray 2. Also shown in FIG. 13, the shipper cover 30 is suspended over the shipper bottom 28 preparatory to being lowered into a latching engagement with the shipper bottom 28, the shipper cover 30 having disk locating elements 32a–32n in cooperating alignment with the grooves 26a–26n in the shipper bottom 28. FIG. 13 also illustrates one of the advantageous features of the disk shipper of the present invention. With the shipper cover 30 removed, the shipper bottom 28 allows access to the external diameter of the disks 24a–24n, substantially below the horizontal centerline of the disk. Thus, the design of this disk shipper is compatible with both internal diameter and external diameter handling of the disks 24a–24n. FIG. 18, similarly to FIG. 13, and FIG. 19, similarly to FIG. 14, illustrates a disk shipper 22.18 of the present invention with the shipper cover 30.18 and the shipper bottom 28.18.

The disk shipper assembly 22 is shown with the shipper cover 30 is latched engagement with the shipper bottom 28 in FIG. 14. In latching the shipper cover 30 to the shipper bottom 28, the latch ledge 36 is firmly engaged by the latch hook 34. A side elevational view of the disk shipper pack is illustrated in FIG. 15 with parts cut away shows the grooves 26a–26n in the shipper bottom 28 below and the disk locating elements 32a–32n in the shipper cover 30 above, configured so that the grooves 26a–26n cooperate with the disk locating elements 32a–32n to maintain the disks 24a–24n in upright parallel spaced-apart alignment. The design of the disk locating elements 32a–32n facilitates secure engagement of the disks 24a–24n in cooperation with the grooves 26a–26n in the shipper bottom 28. The disk locating elements 32a–32n are molded into the top of the shipper cover and each disk locating element 32a–32n is formed of a parallel pair of rails 38 with a molded contact pad 40 positioned therebetween. The shipper bottom 28 is formed of a rigid material while the shipper cover is formed of a resilient flexible material, so that the cooperation of the grooves 26a–26n and the disk locating elements 32a–32n provides a secure cushioning for the disks 24a–24n, respectively. When the disk shipper assembly 22 is latched, the disks 24a–24n are thus firmly and safely held in place preventing transverse or lateral motion. FIG. 19, similarly to FIG. 14, shows the shipper cover 30.18 inlatched engagement with the shipper bottom 28.18. In latching the shipper cover 30.18 to the shipper bottom 28.18, the latch window 106 and detent tooth 108 engage the corresponding striker 110 and latch catch 112. The disk shipper 22.18 contains the same grooves and the same disk locating elements as in the disk shipper 22.

Figure 10:
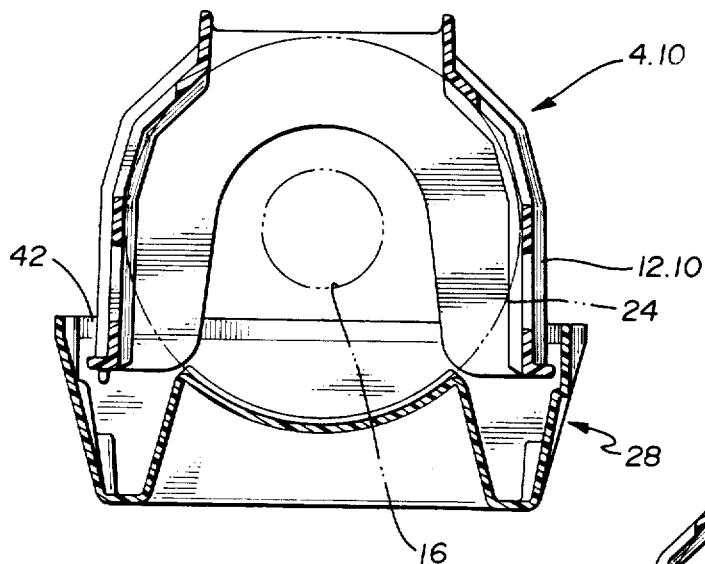
FIG. 10 is a view similar to that of FIG. 9 showing an alternate carrier means.
Figure 11:
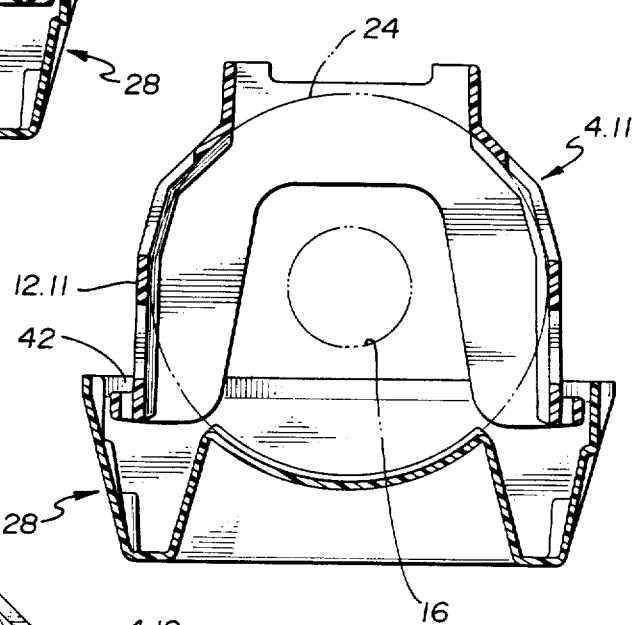
FIG. 11 is a view similar to that of FIG. 9 showing another alternate carrier means.
Figure 12:
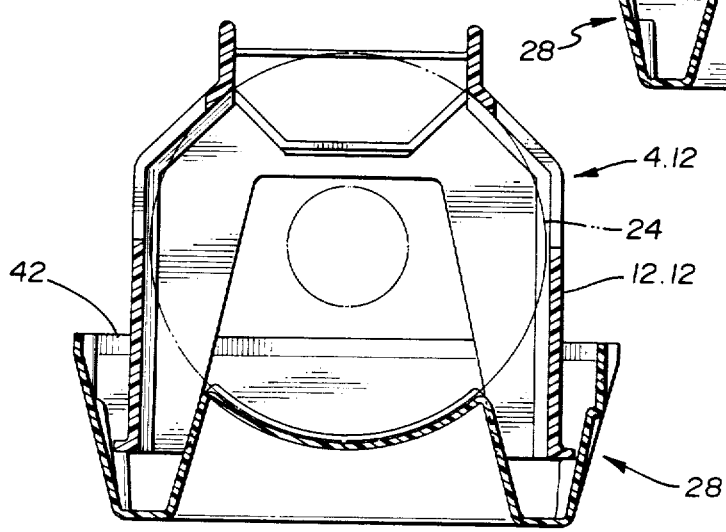
FIG. 12 is a view similar to that of FIG. 9. showing still another alternate carrier means.

In operation, a plurality of disks 24a–24n are loaded into the shipper bottom, with the grooves 26a–26n supporting the disks 24a–24n in upright parallel spaced-apart axial alignment. The loading operation may be performed by any manual or automated procedure. Advantageously, the shipper bottom is designed to accept non-rolling transfer of disks from a compatibly designed disk carrier, as defined herein above. Various transfer compatible disk carriers 4, 4.10, 4.11 and 4.12 are illustrated in FIGS. 9, 10, 11 and 12, respectively, in assembly with the shipper bottom 28 of the disk shipper of this invention. Note that the compatibly designed disk carriers allow access to the disks only by their internal diameter. The female trough 42 inside the four sides and substantially surrounding the disk nest is designed to accommodate the sides 12 of a compatibly designed disk carrier 4. Similarly, as shown in FIGS. 10, 11 and 12, the sides 12.10, 12.11 and 12.12, respectively, of the disk carriers 4.10, 4.11 and 4.12, respectively, are designed to be accommodated by the trough 42 of the shipper bottom 28. The disk carriers shown as 4, 4.10, 4.11 and 4.12 are also transfer compatible with shipper bottom 28.18.

Figure 7:
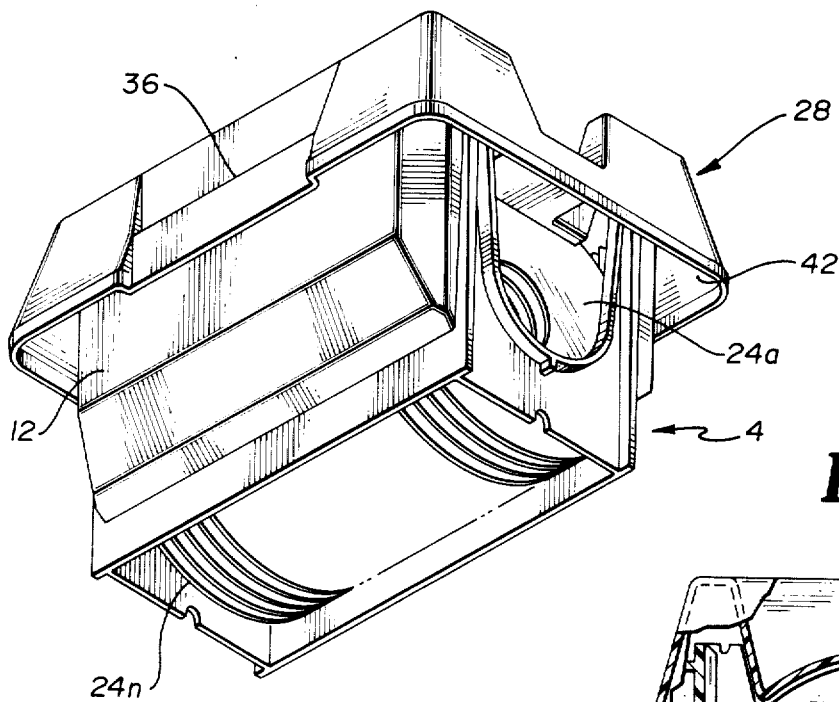
FIG. 7 is a pictorial view of a shipper bottom-disk carrier assembly in a manner similar to that shown for the transfer tray-disk carrier assembly in FIG. 2.
Figure 8:
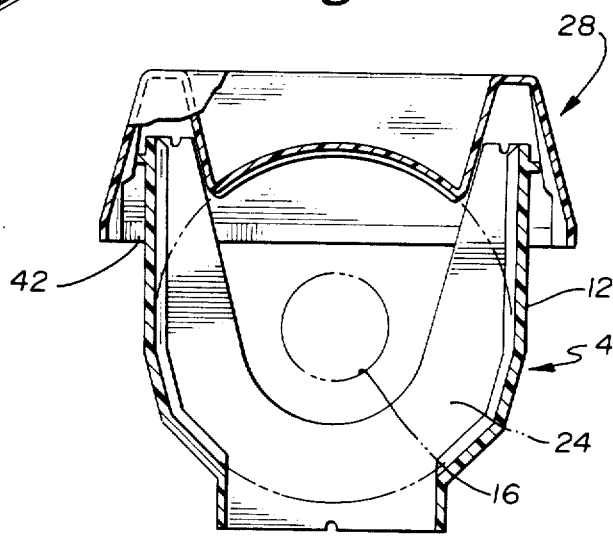
FIG. 8 is an end elevational view of the disk carrier-shipper bottom in the orientation shown in FIG. 7.
Figure 9:
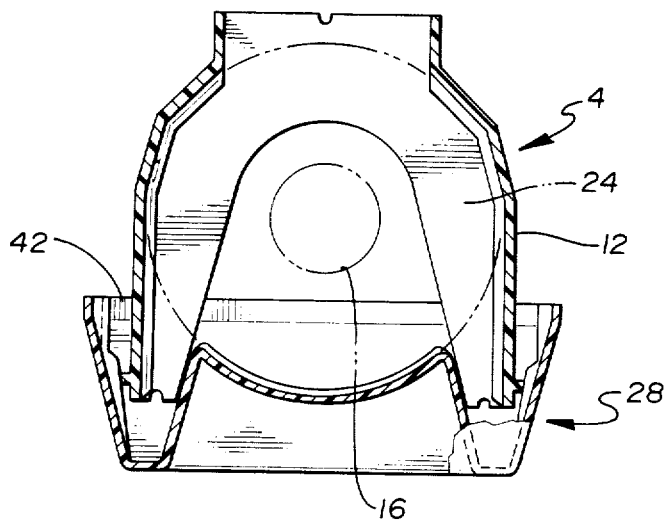
FIG. 9 is a view similar to that of FIG. 8 showing the assembly inverted therefrom.

To accomplish the manual non-rolling transfer of the disks from a compatibly designed disk carrier to the shipper bottom, the inverted shipper bottom is lowered into position over the upright disk carrier so that the grooves 26a–26n of the shipper bottom engage the disks 24a–24n held by the carrier, as illustrated in FIGS. 7 and 8. By firmly holding the shipper bottom and the disk carrier assembly in cooperating alignment, the shipper bottom and the disk carrier assembly is carefully inverted to the position as shown in FIGS. 9, 10, 11 and 12, so that the disks are now resting on the shipper bottom. The cooperating alignment of the grooves 26a–26n of the shipper bottom with the disks 24a–24n held by the disk carrier is such that the inversion is accomplished without rolling or dropping of the disks 24a–24n. The disk carrier is then carefully lifted up and away from the disks 24a–24n, leaving the disks firmly supported by the grooves 26a–26n of the shipper bottom in upright parallel spaced-apart axial alignment. The low profile of the shipper bottom permits free access to the disks 24a–24n substantially below their horizontal centerline, so that the disks are now easily accessible from the shipper bottom by either internal diameter or external diameter handling techniques. No more than 30% of the area of the disk is obscured by the grooves and side walls of the shipper bottom. This transfer procedure also positions the disks 24a–24n in the shipper bottom in proper alignment for latching attachment of the shipper cover 30. In transferring the disks 24a–24n from the shipper bottom to a transfer compatible disk carrier, the above procedures are reversed in order.

To latch the shipper cover 30 to the shipper bottom 28, the cover 30 is lowered into position over the bottom 28 so that the disk locating elements 32a–32n in the cover 30 engage the disks 24a–24n held by the shipper bottom 28. The shipper cover 30 is firmly but gently pressed down over the shipper bottom 28 until each latch hook 34 firmly engages each corresponding latch ledge 36, as illustrated in FIGS. 13 and 14. When using the disk shipper 22.18, illustrated in FIGS. 18 and 19, the latching of the shipper cover 30.18 to the shipper bottom 28.28 is similar, with the latch window 106 and detent tooth 108 engaging the corresponding striker 110 and latch catch 112. The disk shipper now firmly and securely holds the disks without the possibility of transverse or lateral motion, suitable for transport. Removal of the shipper cover 30 is accomplished by upward and outward pressure on each unlatching channel 44. Removal of the shipper cover 30.18 from the shipper bottom 28.18 is similarly accomplished by using the thumb indentation 104 and exerting upward and outward pressure on the corresponding pull 116. The disk shipper has a smooth exterior that permits a heat shrinkable plastic package to be formed around the shipping container if desired and purged with an inert gas to provide additional structural integrity to the shipper and additional protection against environmental contamination.

Figure 20:
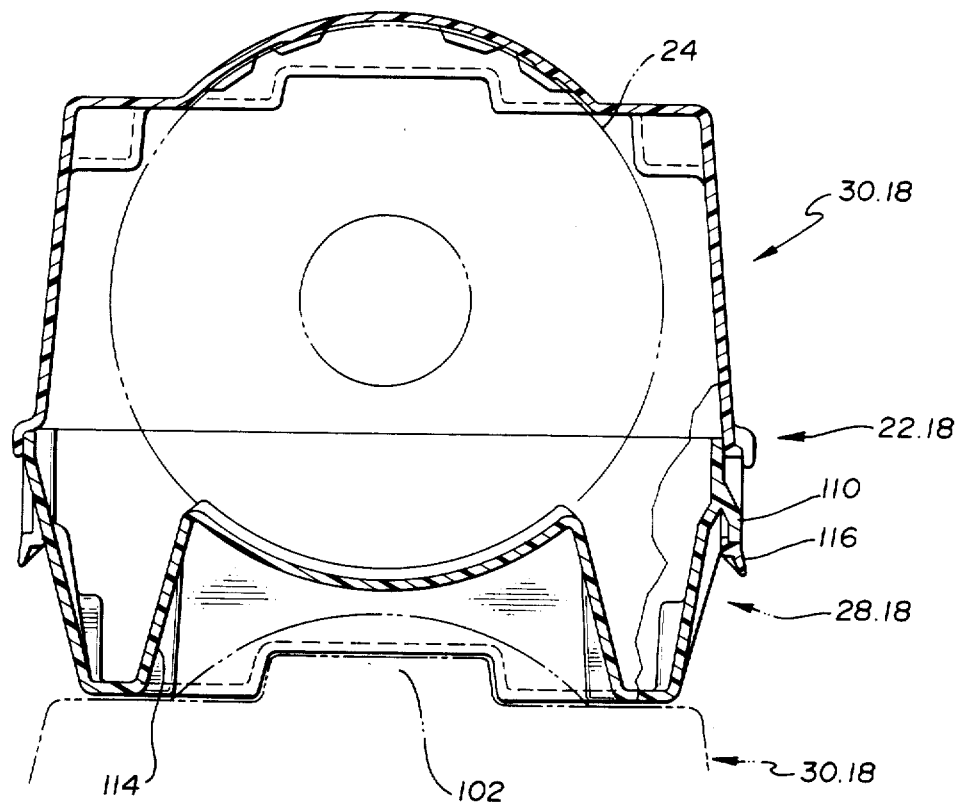
FIG. 20 is a section taken along line 20—20 in FIG. 19.

The assembled shipper packages are designed to be securely stackable with each other. As illustrated in FIGS. 15 and 16, the base sockets 46 of the shipper bottom 28, shown in solid and in phantom line to indicate the stacking configuration, nest over and around the longitudinal arch-shaped protrusion 42 on the top member of the cover 30. As illustrated in FIG. 20, the stacking blister 102 provides additional stacking alignment for the shipper packages 22.18.

Additionally, the shipper bottoms and covers are individually nestable for economy of space. Referring to FIGS. 13 and 18, generally upstanding walls 220 and 222 respectively are sufficiently sloped at normal draft angle or greater to permit an unused plurality of shipper covers to be stacked in a space saving manner. Similarly, referring to FIGS. 13 and 18, generally upstanding walls 230, 231, 232, 234, 236 and 238 respectively are sufficiently sloped at normal draft angle or greater to permit an unused plurality of shipper covers to be stacked in a space saving manner.

The shipper bottom may be formed of a rigid material capable of securely holding and accurately locating the disks. A suitable material has been found to be ABS synthetic resin optionally containing an anti-static protective additive. The shipper cover may be formed of a flexible resilient material capable of cooperating with the rigid shipper bottom to securely hold, accurately locate and resiliently cushion the disks. A suitable material has been found to be polypropylene synthetic resin optionally containing an anti-static protective additive.

The disk shipper of this invention can be formed to accommodate any size diameter and thickness of disks. To facilitate the non-rolling transfer of the disks from a compatibly designed disk carrier, the grooves 26a-26n of the shipper bottom must be configured to cooperatively align with the disks held by the disk carrier. Similarly, the shipper can be formed to accommodate any number of disks, again bearing in mind that the shipper must be sized to accommodate the capacity of the disk carrier from which the disks are to be transferred. Typical capacities of disk shippers are designed to accommodate up to 25, up to 30 or up to 50 disks.

What is claimed is:

1. A disk shipper containing:
   a shipper bottom including a generally rectangular floor member having a disk nest elevated above the floor member, the disk nest comprising a plurality of arcuate disk engaging and supporting grooves curved to the peripheral contour of the disks to engage and support the disks in upright parallel spaced-apart axial alignment, the disks optimally containing a central hole concentric with the circumference of the disk, four sides angled upwardly and slightly outwardly from the floor member, a female trough inside the four sides substantially surrounding the disk nest, latching receiving means on opposite sides of the shipper bottom, cover positioning members extending vertically upwards from the sides of the shipper bottom, the disk nest and the sides of the shipper bottom configured so that the disks are accessible to internal diameter handling of disks having a central hole and to external diameter handling substantially below the horizontal centerline of the disks;
   shipper cover including a generally rectangular top member having a plurality of arcuate disk locating elements in cooperating alignment with the arcuate disk supporting grooves in the shipper bottom for maintaining the disks in upright parallel spaced-apart axial alignment, four sides angled downwardly and slightly outwardly from the top member, latching engaging means on opposite sides of the shipper bottom for latching attachment with the latching receiving means on the shipper bottom, and bottom positioning members extending vertically downwards from the sides in cooperating alignment with the cover positioning members on the shipper bottom; and
   the shipper bottom is transfer compatible with a disk carrier, the disk carrier having opposed side walls for carrying a plurality of axially aligned disks therebetween, an open top through which disks may be inserted and ejected, end walls joining the side walls, a bottom having disk support surfaces engaging and supporting the disks in upright parallel spaced-apart axial alignment, the disk support surfaces of the disk carrier and the disk supporting grooves of the shipper bottom having the same radius of curvature, maintaining the same axial disk spacing between the plurality of disks, and having the same total disk capacity, the side walls of the disk carrier configured so as to be able to fit into the trough of the shipper bottom, allowing the plurality of disks to be engaged and supported by both the disk support surfaces of the disk carrier and by the disk supporting grooves of the shipper bottom simultaneously, so that the disks can be transferred from the shipper bottom to the disk carrier and from the disk carrier to the shipper bottom in a non-rolling transfer.

2. A disk shipper according to claim 1 wherein:
   on the shipper cover, the plurality of arcuate disk locating elements define a longitudinal arch shaped protrusion on the exterior of the top member;
   on the shipper bottom, the female trough defines base sockets on the exterior of the bottom member; and
   the base sockets nest over and around the longitudinal arch shaped protrusion for stacking of like packages.

3. A disk shipper according to claim 1 wherein shipper covers of like packages are nestable when empty and shipper bottoms of like packages are nestable when empty.

4. A disk shipper according to claim 2 wherein the shipper bottom is formed of a rigid plastic and the shipper cover is formed of a flexible resilient plastic and the package has a capacity of up to 25 disks.

5. A disk shipper according to claim 4 wherein the shipper bottom is formed of ABS synthetic resin optionally containing an anti-static protective additive and the shipper cover is formed of polypropylene synthetic resin optionally containing an anti-static protective additive.

6. A disk shipper according to claim 5 wherein the arcuate disk locating elements in the shipper cover each are formed of a parallel pair of rails with a molded contact pad positioned therebetween to provide a secure cushioning for the disks.

7. A disk shipper according to claim 1, wherein the latching receiving means of the shipper bottom comprises a latch ledge and the latching engaging means on the shipper cover comprises a latch hook.

8. A disk shipper according to claim 1, wherein the latching receiving means on the shipper bottom comprises a latch window with a detent tooth, the latching engaging means on the shipper cover comprises a striker and latch catch, and the shipper cover has thumb indentations to facilitate latching and unlatching.

9. A disk shipper according to claim 1, wherein the disk nest and the side walls of the shipper obscure no more than 30% of the total area of the disks.

10. A disk shipper according to claim 1, wherein the disk shipper has a smooth exterior for enclosing the disk shipper in shrink wrap.

11. A package for disks and disk like materials including a package cover and a package bottom, wherein the package bottom is transfer compatible with a carrier for disks and disk like materials, comprising:

a package bottom having a floor member and supporting a plurality of disks, the disks optimally containing a central hole concentric with the circumference of the disk in spaced axial alignment therein in a disk nest elevated above the floor member, a female receiving trough substantially surrounding the disk nest, the trough and the disk nest configured so that the disks and disk like materials are accessible to handling by both their internal diameter of disks having a central hole and by their external diameter substantially below their horizontal centerline, and latch receiving means on opposing ends of the package bottom;

a package cover for enclosing the package bottom and the plurality of disks or disk like materials in spaced axial relationship therein, and latch engaging means on opposing ends of the package cover for latching with the latch receiving means on the package bottom; and the carrier for disks and disk like materials having a housing for supporting a plurality of disks or disk like materials in spaced axial alignment therein, an open top for inserting and ejecting disks and disk like materials therethrough, the package bottom and the carrier supporting disks and disk like materials of the same radius of curvature, the same axial spacing and the same capacity, the side walls of the carrier configured so as to be able to fit into the trough of the package bottom, allowing the plurality of disks or disk like materials to be engaged and supported by both the package bottom and the carrier simultaneously, so that the disks or disk like materials can be transferred from the package bottom to the carrier or from the carrier to the package bottom in a non-rolling transfer.

12. A package according to claim 9, wherein the exterior of the package cover and the exterior of the package bottom have means for stacking of like packages.

13. A package according to claim 9, wherein package covers of like packages are nestable when empty and package bottoms of like packages are nestable when empty.

14. A disk transfer tray comprising:

a generally rectangular receptacle having a floor member with a disk nest elevated above the floor member, the disk nest comprising a plurality of arcuate disk supporting grooves curved to the peripheral contour of the disks to support the disks in upright parallel spaced-apart axial alignment, the disks optimally containing a central hole concentric with the circumference of the disk, handle holds on opposite sides of the transfer tray and downwardly angled feet to support the transfer tray in self standing position, the transfer tray configured to allow internal diameter of disks having a central hole, handling or external diameter handling of the disks substantially below the horizontal centerline of the disk; and the transfer tray is transfer compatible with a disk carrier, the disk carrier having opposed side walls for carrying a plurality of axially aligned disks therebetween an open top through which disks may be inserted and ejected, end walls joining the side walls, a bottom having disk support surfaces engaging and supporting the disks in upright parallel spaced-apart axial alignment, the disk support surfaces of the disk carrier and the disk supporting grooves of the transfer tray having the same radius of curvature, maintaining the same axial disk spacing between the plurality of disks, and having the same total disk capacity, the side walls of the disk carrier configured so as to allow the plurality of disks to be engaged and supported by both the disk support surfaces of the disk carrier and by the disk supporting grooves of the transfer tray simultaneously, so that the disks can be transferred from the transfer tray to the disk carrier or from the disk carrier to the transfer tray in a non-rolling transfer.

15. A transfer tray according to claim 14 which is nestable with like trays when empty.

16. A transfer tray according to claim 14 which is formed of a rigid plastic and has a capacity of up to 25 disks.

17. A transfer tray according to claim 14 which is formed of ABS synthetic resin optionally containing an anti-static protective additive.

18. A transfer tray according to claim 14 wherein no more than 30% of the total area of the disks is obscured by the supporting grooves.

* * * * *

UNITED STATES PATENT AND TRADEMARK OFFICE
CERTIFICATE OF CORRECTION

PATENT NO. : 4,718,552

DATED : January 12, 1988

INVENTOR(S) : Alexander N. Rossi and Lynn Milbrett

It is certified that error appears in the above-identified patent and that said Letters Patent is hereby corrected as shown below:

Title page:

Delete filing date of "December 1, 1986" and

Insert correct filing date of -December 11, 1986-

Signed and Sealed this

Fourteenth Day of June, 1988

Attest:

DONALD J. QUIGG

Attesting Officer

Commissioner of Patents and Trademarks